Jan. 5, 1926.  1,568,207
B. E. BRAUCHT
DEMOUNTABLE RIM FOR VEHICLES
Filed March 14, 1925
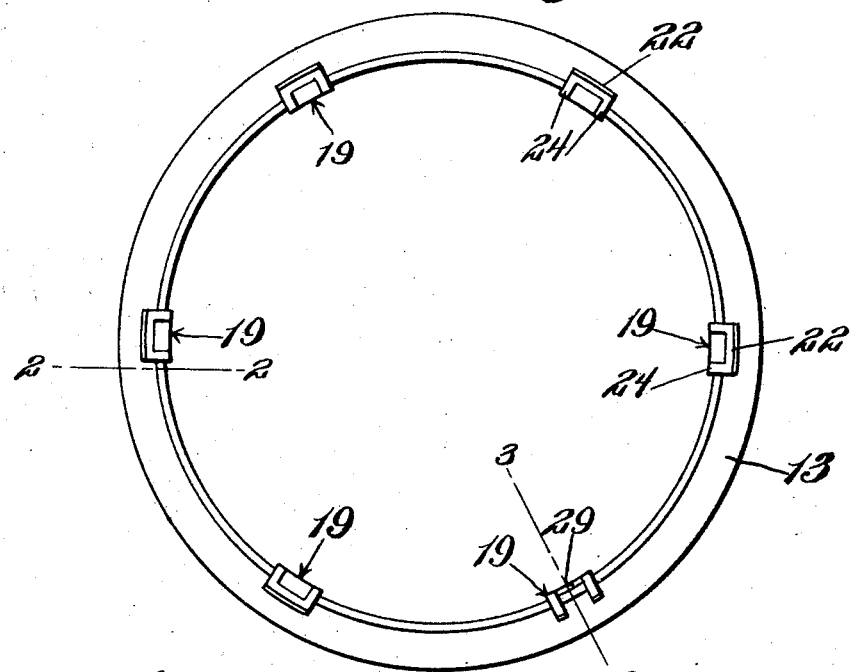
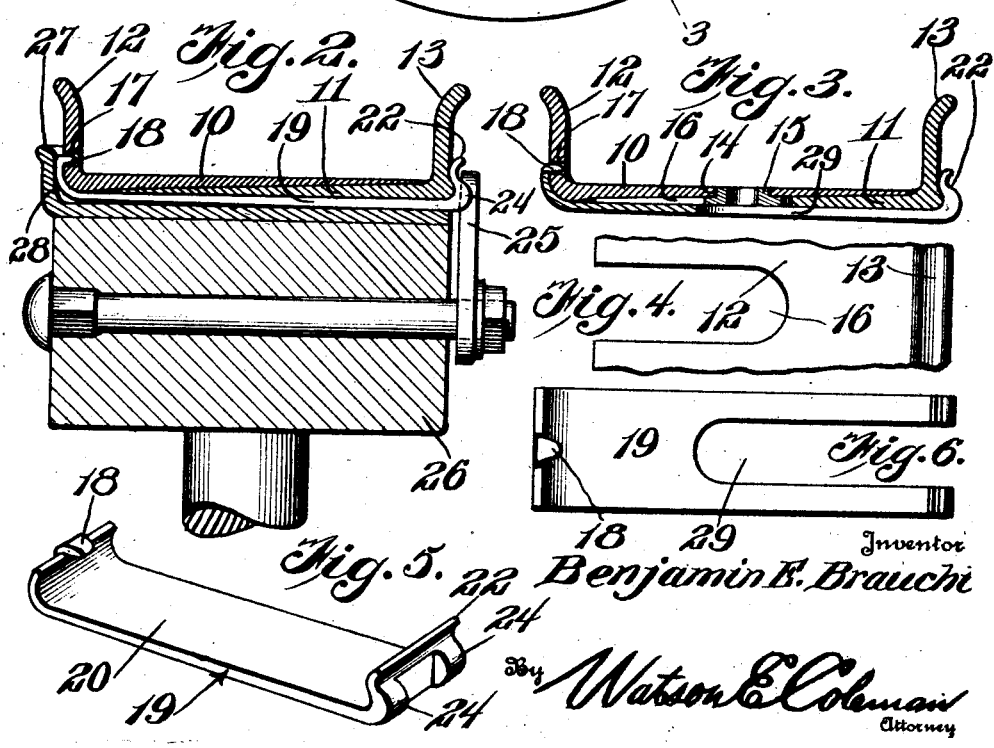
Inventor
Benjamin E. Braucht
By Watson E. Coleman
Attorney Patented Jan. 5, 1926.

1,568,207

UNITED STATES PATENT OFFICE.

BENJAMIN E. BRAUCHT, OF CROSBY, NORTH DAKOTA.

DEMOUNTABLE RIM FOR VEHICLES.

Application filed March 14, 1925. Serial No. 15,605.

*To all whom it may concern:*

Be it known that I, BENJAMIN E. BRAUCHT, a citizen of the United States, residing at Crosby, in the county of Divide and State of North Dakota, have invented certain new and useful Improvements in Demountable Rims for Vehicles, of which the following is a specification, reference being had to the accompanying drawings.

This invention relates to demountable rims for vehicles and has for an important object thereof the provision of a demountable rim, the portions of which may be readily assembled and maintained in assembled relation and which may be readily attached to and from a wheel.

A further object of the invention is to provide a device of this character in which the assembly of the rim sections upon the tire proper is facilitated and means are provided for holding the rim sections in assembled relation while the rim is supporting a tire upon a tire carrier or the like.

These and other objects I attain by the construction shown in the accompanying drawings, wherein for the purpose of illustration is shown a preferred embodiment of my invention and wherein:—

Figure 1 is a side elevation of a rim constructed in accordance with my invention;

Figure 2 is a section through the rim when in position upon a tire, the section being taken on the line indicated by 2—2 of Figure 1;

Figure 3 is a section on the line 3—3 of Figure 1;

Figure 4 is a detailed face view of the outer rim section at the slot 16;

Figure 5 is a perspective of one of the flexible clamps; and

Figure 6 is a plan view of the clamp employed at the tube valve opening.

Referring now more particularly to the drawings, the demountable rim is formed in two sections 10 and 11 hereinafter referred to as the inner and outer sections respectively, each of these sections having at its outer side edge an upstanding tire retaining flange, these flanges being indicated at 12 and 13 respectively. The sections themselves are preferably tapered in width from the outer to the inner edges thereof so that they combine to form a base of uniform thickness for the reception of the tire and at the same time they may be very readily assembled. The inner rim section 10 has an opening therethrough indicated at 14 and preferably provided with a guide bushing 15 for the passage of the stem of a tire tube. The corresponding point of the outer rim is notched inwardly from its inner edge, as indicated at 16, to permit passage of this bushing.

At circumferentially spaced points, the flange 12 of the inner section 10 is provided with openings 17, these openings receiving the hooked end portions 18 of assembly clamps 19. These assembly clamps have a body portion 20 underlying the body portion of the rim and fitting flatly thereagainst and at their outer ends have an upstanding flange 22, the upper end of which is constructed to spring over a lug or shoulder 23 formed upon the outer face of the outer rim section 11 at the base of the flanges 13 thereof. The upstanding flanges 22 will be resilient to permit their snapping into place and will clamp these sections in assembled relation to prevent separation thereof when the sections are employed for holding a tire upon a tire carrier. The outer end of the body portion 20 of the clamps is preferably provided with a pair of lugs 24 spaced circumferentially apart a sufficient distance to permit engagement therebetween and against the end of the clamp of a rim lug 25 such as is ordinarily employed with demountable rims. The clamps 19 further preferably have the body portions thereof tapered slightly from their outer to their inner ends so that as the tire rim is forced upon the felly 26 of the wheel with which it is to coact, it will tend to bind as it reaches its seated position and hold the tire solidly in position. The rim 27 of the flange will be deformed at points corresponding to the clamps, as indicated at 28, to accommodate the inner end portions of the clamps.

One of the clamps 19 aligns with the guide bushing 15. This clamp is formed with a slot 29 for the passage of this guide bushing and of the valve stem. It will be obvious from the foregoing that the assembly of the rim sections upon a tire may be very readily accomplished, it being simply necessary to insert the valve stem through the guide bushing 13, move the sections into assembled relation and apply the clamps by springing them into position. When the lugs of the wheel are placed into position to hold the rim in position upon the wheel, these lugs will assist the clamps in the performance of their function.

Since the structure hereinbefore set forth is obviously capable of a considerable range of change and modification without departing from the spirit of my invention, I do not limit myself to such specific structure except as hereinafter claimed.

I claim:—

1. A demountable rim comprising two telescopic sections each having upon its outer edge an upstanding tire retaining flange, the flange of one of said sections being provided with circumferentially spaced openings, the flange of the other of the sections having a circumferential shoulder and spring clips each having one end engaged in an opening of the first named flange and the opposite end sprung over the shoulder of the last named flange retaining said sections in assembled relation, the outer ends of said clips having spaced shoulders adapted to receive therebetween the ends of lugs for maintaining the rim in position upon the wheel of a vehicle.

2. A demountable rim comprising two telescopic sections each having upon its outer edge an upstanding tire retaining flange, the flange of one of said sections being provided with circumferentially spaced openings, the flange of the other of the sections having a circumferential shoulder and spring clips each having one end engaged in an opening of the first named flange and the opposite end sprung over the shoulder of the last named flange retaining said sections in assembled relation, the last named flange being disposed upwardly when the rim is in position upon a wheel, said clips including body portions underlying the rim and increasing in thickness toward the outer ends thereof, the outer ends of said clips having spaced shoulders adapted to receive therebetween the ends of lugs for maintaining the rim in position upon the wheel of a vehicle.

In testimony whereof I hereunto affix my signature.

BENJAMIN E. BRAUCHT.